United States Patent Office 3,471,524
Patented Oct. 7, 1969

3,471,524
PROCESS FOR THE MANUFACTURE OF 4:4'-DI-AMINO - 1:1' - DIANTHRAQUINONYL - 3:3' - DI-SULFONIC ACID
Arnold Wick, Therwil, Basel-Land, Switzerland, assignor to Ciba Limited, Basel, Switzerland, a Swiss company
No Drawing. Filed Dec. 4, 1964, Ser. No. 416,116
Claims priority, application Switzerland, Dec. 13, 1963, 15,308/63; Sept. 25, 1964, 12,503/64
Int. Cl. C09b 1/24
U.S. Cl. 260—367        4 Claims

ABSTRACT OF THE DISCLOSURE

4:4'-diamino-1:1-dianthraquinonyl-3:3'-disulfonic and, a valuable dyestuff intermediate, is prepared by treating 1-aminoanthraquinone-2-sulfonic acid with a Friedel-Crafts catalyst at a temperature of 50° to 150° C. in the presence of a tertiary amine.

---

It is known from German Patent No. 470,550 granted Jan. 3, 1929, to I. G. Farbenindustrie A.G., Frankfurt am Main, that 1:1'-diamino-2:2'-dianthraquinonyl can be obtained by treating 1-aminoanthraquinone with an aluminum halide in the presence of an organic base. The present invention is based on the surprising observation that 4:4'-diamino-1:1'-dianthraquinonyl-3:3' - disulfonic acid may be obtained when 1-aminoanthraquinone-2-sulfonic acid is treated with a Friedel-Crafts catalyst.

Suitable Friedel-Crafts catalysts are aluminum chloride, aluminum bromide, ferric chloride, zinc chloride, tin tetrachloride, antimony chlorides, zirconium tetrachloride or titanium tetrachloride.

The reaction may be performed, for example, in a melt of the reagents mentioned above, advantageously in the presence of a flux as is used for carbolizing reactions; in individual cases it may be a moot point in how far such a flux is capable of forming molecular compounds with the Friedel-Crafts catalyst. As such fluxes aromatic organic compounds may be mentioned, e.g. nitrobenzene, inorganic compounds e.g. sulfur dioxide, sodium bisulfite, sodium chloride, sodium fluoride and sodium bromide, amides e.g. urea and dimethylformamide either by themselves or in combinations of two or more such substances. As a rule advantageous results are obtained by using aluminum chloride with addition of a tertiary base, for example a tertiary base that is free from hydroxyl groups, for example triethylamine or dimethylamine. Particularly suitable are, for example, cyclic bases, for example quinoline or acridine and above all pyridine and its closest homologues, for example methylpyridines such as α-picoline or mixtures of pyridine bases, such as the commercial β:γ-picoline mixture. Likewise suitable are combinations of the melting methods referred to above with one another. For every part by weight of aminoanthraquinone it is advantageous to use at least one part by weight of Friedel-Crafts catalyst. The ratio between the Friedel-Crafts catalyst and the flux is advantageously selected so that an easily stirrable melt forms at about 70° C. When a pyridine base is used, it is of advantage to work at a ratio of Friedel-Crafts catalyst: base of 1:1 to 1:2.

If required or desired, the reaction may be performed in the presence of a catalytically active metal or of a compound thereof, for example a salt, for example copper, nickel, iron, cobalt, chromium, manganese, sodium, magnesium, calcium, zinc, cadmium, aluminum, titanium, antimony, arsenic, bismuth, lead, tin, silver, gold, vanadium, tantalum, tungsten, zirconium, palladium or silicon. Instead of the pure metals their alloys may be used, for example, aluminum-nickel, aluminum-cobalt, aluminum-iron, aluminum-copper, brass, bronze, cast iron, stainless steel, "anticorrodal" or Wood's metal.

The metals referred to above are preferably used in the form of powders, chips or granules.

As a rule a catalytic amount of the aforementioned additives will suffice. In conjunction with them further additives may be used, for example, oxidants.

The reaction is advantageously carried out at an elevated temperature, for example at a temperature ranging from 50° to 150° C.

The working up of the resulting 4:4'-diamino-1:1'-dianthraquinonyl-3:3'-disulfonic acid consists advantageously in introducing the reaction mixture into water, whereupon the dianthraquinonyl settles out (if required after an addition of sodium chloride) and can be isolated by filtration.

The 4:4' - diamino - 1:1'-dianthraquinonyl-3:3'-disulfonic acid make accessible by the present process is a valuable dyestuff intermediate which is obtained in a particularly simple manner by the process of this invention.

Unless otherwise indicated, parts and percentages in the following examples are by weight.

EXAMPLE 1

0.2 part of rapidly suctioned, moist copper powder [prepared as described in Org. Synth. Coll., volume II, page 446] and then 8 parts of the sodium salt of 1-aminoanthraquinone-2-sulfonic acid [commercial product of 87.5% purity] were added in a short time with stirring to a melt at 70° C. prepared from 9.6 parts of anhydrous aluminum chloride and 32 parts of pyridine (dried over potassium hydroxide). The batch was then heated to 80° C. and stirred for 6 hours at 80° to 85° C. The reaction mixture was cooled to 60° C., diluted with 10 parts of pyridine and stirred into 600 parts of ice-water. The claret colored solid product was filtered by suction, washed in the crude state with water, pasted with 600 parts of water and treated with concentrated hydrochloric acid until the mixture was acid to Congo red. The batch was stirred for a short time, filtered by suction and washed with 5% sodium sulfate solution.

The moist crude product was boiled twice with 150 parts of water containing sodium carbonate on each occasion until it was weakly alkaline and the extracts were filtered while still hot. When the hot filtrates were combined, mixed with 6 parts of anhydrous sodium sulfate and allowed to cool, small, dark-red needles separated out which were suction filtered, washed with 2% sodium sulfate solution and dried.

The resulting crystalline product was identical with the product obtained according to patent application Ser. No. 105,876, filed Apr. 27, 1961 by Max Jost et al., i.e. the sodium salt of 4:4'-diamino-1:1'-dianthraquinonyl-3:3'-disulfonic acid.

Instead of copper powder in the present example other metals or alloys may be used as catalytic additive; the following lists are intended to show the wide variety of active additives available:

(a) Sodium chips, silver powder, gold sponge, magnesium powder, calcium chips, zinc duct, cadmium chips, mercury, aluminum powder, boron powder, titanium powder, zirconium powder, silicon powder, tin powder, fine lead granules, vanadium powder, tantalum powder, arsenic powder, antimony powder, bismuth powder, chromium powder, tungsten powder, iron filings and palladium powder.

(b) Powdered alloys of aluminum+nickel, aluminum +cobalt, aluminum-iron, aluminum+copper, Wood's metal, brass powder, bronze filings, "anticorrodal" chips. Monel metal filings, cast iron powder and chips of stainless steel.

EXAMPLE 2

90 parts of anhydrous aluminum chloride were stirred with 300 parts of distilled pyridine which had been stored over potassium hydroxide to form a melt. At 70° C. 75 parts of the sodium salt of 1-aminoanthraquinone-2-sulfonic acid [commercial product of 87.5% purity] were then stirred in the temperature raised to 80° to 85° C. and the whole stirred for 6 hours. It was then diluted with 100 parts of pyridine and at 60° C. poured into a mixture of 400 parts of ice and 400 parts by volume of 40% sodium hydroxide solution. The resulting suspension was freed from pyridine with steam, allowed to cool and suctioned.

The isolated solid product was washed first with 1,000 parts of 2% sodium hydroxide solution and then with 5% sodium sulfate solution until it reacted substantially neutral. It was then dissolved in 2,000 parts of desalted boiling water, a small amount of residue was filtered off while still hot and rinsed with 250 parts of boiling water. 45 parts of anhydrous sodium sulfate were then stirred into the hot filtrate; on cooling, the pure sodium salt of 4:4' - diamino-1:1'-dianthraquinonyl-3:3'-disulfonic acid settled out in a good yield and was further worked up as described in Example 1.

In the process described above commercial pyridine could also be used in a similar manner. The condensation reaction also took place when quinoline was used.

EXAMPLE 3

Using equal proportions as in Example 2, but replacing pyridine by a commercial $\beta$:$\gamma$-picoline mixture, the condensation was equally successful.

What is claimed is:

1. A process for the manufacture of 4:4'-diamino-1:1'-dianthraquinonyl-3,3'-disulfonic acid and its salts which comprises treating 1-aminoanthraquinone-2-sulfonic acid and its salts at a temperature ranging from 50–150° C. in the presence of a tertiary base with a Friedel-Crafts catalyst.

2. A process as claimed in claim 1, wherein anhydrous aluminum chloride is used as Friedel-Crafts catalyst.

3. A process as claimed in claim 1, wherein the tertiary base used is a pyridine base.

4. A process as claimed in claim 1, wherein the reaction is performed in the presence of a metal.

References Cited

FOREIGN PATENTS 451,495  1929  Germany.
470,550  1929  Germany.

LORRAINE A. WEINBERGER, Primary Examiner

HAROLD C. WEGNER, Assistant Examiner